United States Patent [19]

Sato

[11] Patent Number: 4,581,094

[45] Date of Patent: Apr. 8, 1986

[54] DEVICE FOR SUCTION-STICKING DISPLAY LABELS

[75] Inventor: Hirokazu Sato, Kyoto, Japan

[73] Assignee: Kabushiki Kaisha Ishida Koki Seisakusho, Kyoto, Japan

[21] Appl. No.: 570,368

[22] Filed: Jan. 13, 1984

[30] Foreign Application Priority Data

Jan. 25, 1983 [JP] Japan .................................... 58-7959
Jan. 25, 1983 [JP] Japan .................................... 58-7960

[51] Int. Cl.⁴ ........................ B32B 31/00; B65H 26/00; B44C 1/00; B31F 5/00

[52] U.S. Cl. .................................... 156/352; 156/361; 156/497; 156/542; 156/556; 156/584; 156/DIG. 33; 156/DIG. 38

[58] Field of Search ................ 156/497, 540, 541, 542, 156/384, 285, 387, 361, 572, 584, DIG. 1, DIG. 24, DIG. 28, DIG. 31, DIG. 33, DIG. 38, DIG. 47, 556, 363, 357

[56] References Cited

U.S. PATENT DOCUMENTS

| | | | |
|---|---|---|---|
| 3,736,208 | 5/1973 | Kraft et al. | 156/497 |
| 3,984,277 | 10/1976 | French et al. | 156/497 |
| 4,025,382 | 5/1977 | DelRosso | 156/497 |
| 4,202,637 | 5/1980 | Tummolo | 156/384 |
| 4,295,915 | 10/1981 | Sakaguchi et al. | 156/384 |
| 4,314,869 | 2/1982 | Crankshaw | 156/285 |

*Primary Examiner*—Edward Kimlin
*Assistant Examiner*—Louis Falasco
*Attorney, Agent, or Firm*—Browdy and Neimark

[57] ABSTRACT

This device relates to a device for suction-sticking display labels, in which display labels without being printed have been stuck contiguously in many number onto a long ground sheet which is wound on a feeding reel, the labels are peeled by a peeling metal fitting after they are printed, the ground sheet only is wound on a winding reel, the display labels are adsorbed by a suction bracket which is provided in front of the peeling metal fitting being drawn by the air intaken by the intake/exhaust duct of the sticking device, and the display labels are stuck by the blow of air onto predetermined positions of package trays that come beneath the sticking device. In particular, this device relates to a device for suction-sticking display labels, in which the label which is peeled off from the ground sheet being adsorbed by the intake/exhaust bracket but which is still adhered at its rear end to the ground sheet, is forcibly peeled off by a proceed/rectract device together with the intake/exhaust bracket.

5 Claims, 14 Drawing Figures

FIG.1
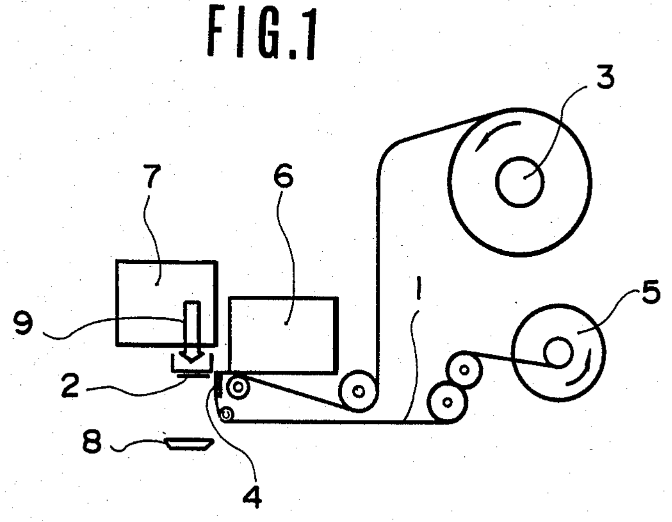
FIG.2
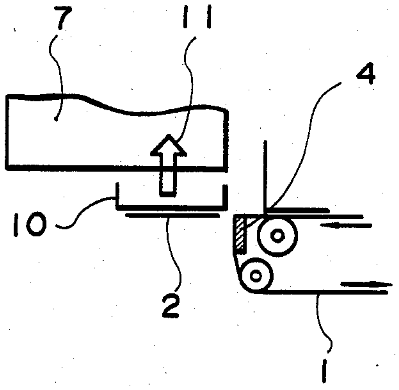
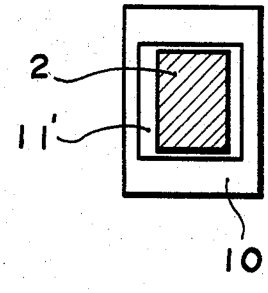
FIG.3

FIG. 13
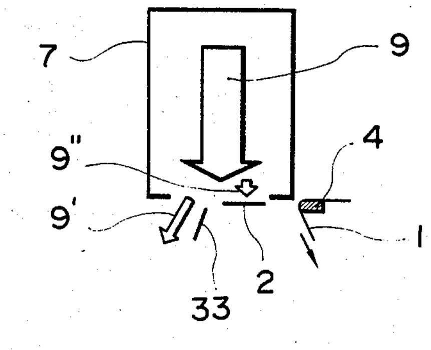
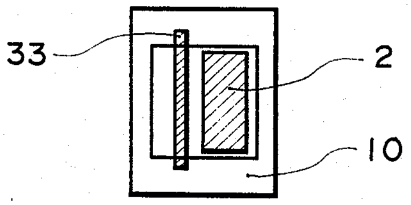
FIG. 14

DEVICE FOR SUCTION-STICKING DISPLAY LABELS

BACKGROUND OF THE INVENTION

1. Field of the Invention

This invention relates to the automatically sticking labels displaying weights, unit prices, prices and the like onto package trays that are arranged in display cases of supermarkets.

2. Description of the Prior Art

In distribution industries such as supermarkets, as is well known, there are displayed a large number of, a great quantity of, and a wide variety of goods. To eliminate weighing and calculation of prices at each sale at a cashier, labels are in many cases stuck onto them to display weight, unit price, price, valid date, etc.

In recent years, there has been devised and employed a system which automatically weighs and calculates goods such as meat, slices and the like at the time when they are packaged in the trays made of foamed styrol, and sticks labels to display the measured and calculated values.

Usually, the automatic label-sticking device of this type works in synchronism with the line of packages containing goods.

Namely, as schematically shown in FIG. 1, labels 2 of a predetermined size are contiguously stuck with an adhesive onto a long tape-like ground sheet 1 which is wound on a feeding reel 3, the label 2 is peeled by a peeling metal fitting 4, the ground sheet 1 only is wound on a winding reel 5, values such as weights, unit prices, prices, etc. are printed by a printer 6 onto the label 2 in front of the peeling metal fitting 4, the label which is peeled by the peeling metal fitting 4 is adsorbed by an intake/exhaust bracket of the intake/exhaust duct being pulled by the air which is sucked by a sticking device 7, the label stays in this condition until a package tray 8 comes just beneath it, and the label is pushed down by the air blown from the sticking device as designated at 9 and is stuck onto a predetermined position on a sheet of the package tray 8.

According to the conventional sticking device as shown in FIG. 2, the label 2 is peeled from the ground sheet 1 by the peeling metal fitting and is sent forward so that it is adsorbed at the position of the intake/exhaust bracket 10.

Here, however, the ground sheet 1 is wound intermittently in synchronism with the operation for sticking the label 2 onto the package tray 8.

Under the condition in which the label 2 is at rest at the position of the intake/exhaust bracket 10, therefore, winding of the ground sheet 1 is also stopped, and the rear end of the label remains slightly adhered to the ground sheet 1.

The package tray 8 then comes just under the label 2 which is maintained under the condition mentioned above, and the damper is switched so that the exhaust air 9 will act upon the label 2. The label, however, is not often peeled off completely since its rear end remains adhered to the ground paper 1 as mentioned above.

Rather, the whirling moment acts upon the label so that it is stuck again onto the ground sheet; i.e., the label is not often descended and stuck onto the package tray 8.

When the exhaust air pressure is weak, in particular, the probability of failure becomes high.

To cope with this problem, there has been proposed to provide a conveyor to convey the label peeled by the peeling metal fitting 4 to the intake/exhaust bracket.

With the conveyor running under the intake/exhaust bracket, however, the adhesive of the labels is adhered to the conveyor and, further, the mechanism becomes comples.

Moreover, sticking positions undergo variation which deteriorates appearance and adversely affects commercial values.

According to a conventional sticking device 7 as shown in FIG. 3, an air-flow hole 11′ of an intake/exhaust bracket 10 has a size that meets the label 2 of a large size.

Therefore, the label 2 is adsorbed by the intake/exhaust bracket 10 and is blown down by the air so as to be stuck to a predetermined position on each package tray 8 as designed, provided the label 2 has a predetermined size.

The label 2 is more rigid than the ground sheet 1. Therefore, the label 2 travels forward straight when it is peeled by the peeling metal fitting 4 from the ground sheet 1 that goes back round the peeling metal fitting 4 describing an acute angle.

In this case, the rear end of the label 2 is still adhering to the ground sheet 1. Depending upon the size, therefore, the front end of the label 2 is located at different positions in the air-flow hole 11 of the intake/exhaust bracket 10.

In the case of a small label 2, therefore, a gap is formed between the front end of the label 2 and the remaining portion of the air-flow hole 11′ of the intake/exhaust bracket 10.

When the air is to be blown down, therefore, the air escapes through the gap, whereby the label 2 of a small size descends being deviated sidewardly and is not stuck onto a predetermined position.

Namely, the labels are stuck onto varying positions which deteriorate appearance and hinder commercial values.

SUMMARY OF THE INVENTION

This device is to solve the above-mentioned problems inherent in the conventional device for suction-sticking display labels. The first object of the device therefore is to provide a device for suction-sticking display labels, which is capable of reliably peeling the labels from the ground sheet by slightly moving an intake/exhaust bracket to stick them onto predetermined positions, and the second object of the device therefore is to provide a device for suction-sticking display labels, which is capable of reliably sticking display labels of different sizes onto predetermined positions by utilizing an intake/exhaust bracket, thereby to present great advantage for the distribution industries where labels play an important role.

BRIEF DESCRIPTION OF THE DRAWINGS

FIG. 1 is a schematic diagram of a device for suction-sticking display labels;

FIG. 2 is a side view which schematically explains the air flow for adsorbing the label according to the conventional art;

FIG. 3 is a bottom view of an intake/exhaust bracket and of a label;

FIG. 13 is a side view of air-blow of embodiment of FIG. 10; and

FIG. 14 is a bottom view of an intake/exhaust bracket and of a label.

DETAILED DESCRIPTION OF THE PREFERRED EMBODIMENT

Figure 4:
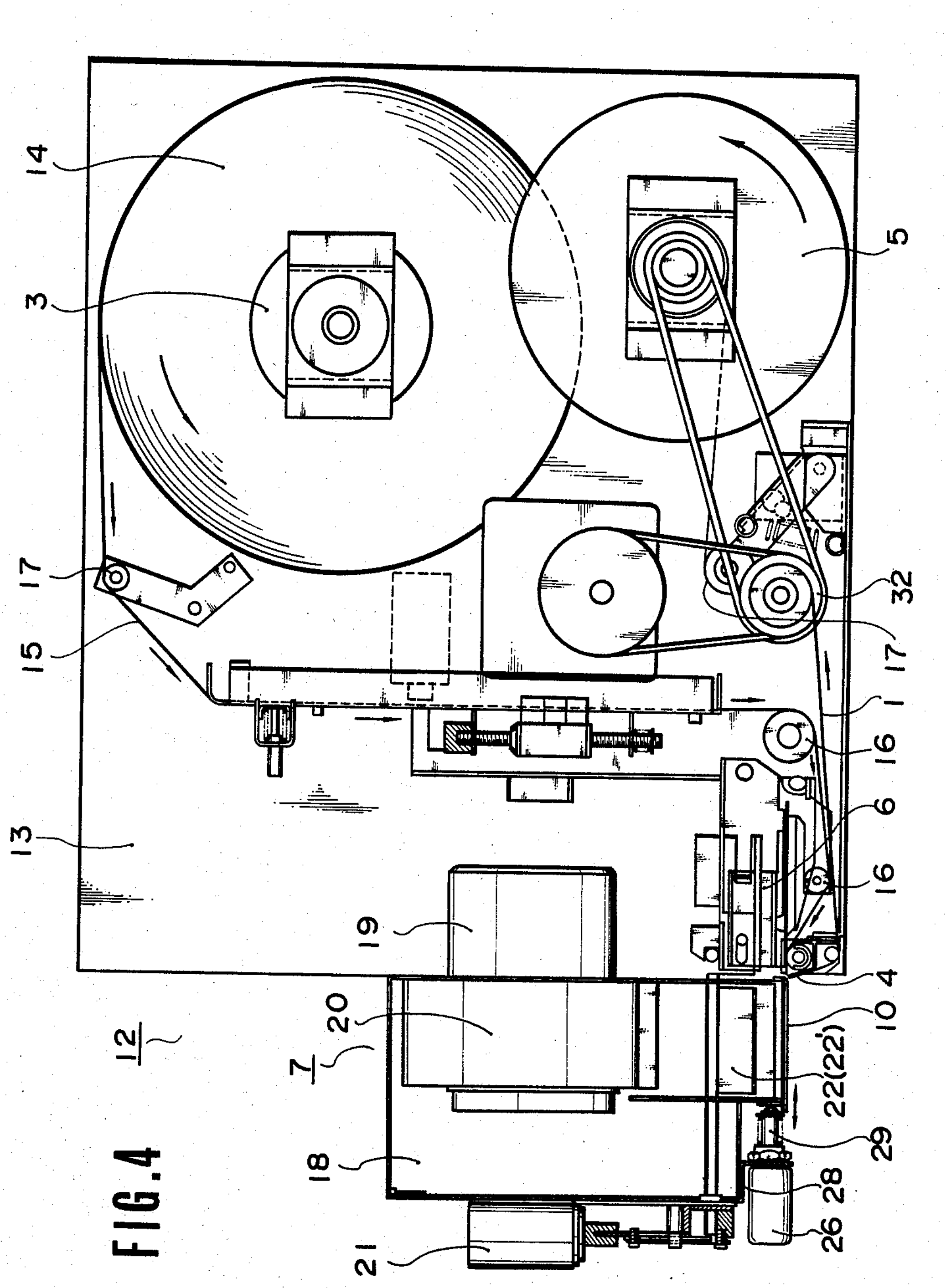
FIG. 4 is a side view which schematically shows the whole construction according to an embodiment of this device.
Figure 5:
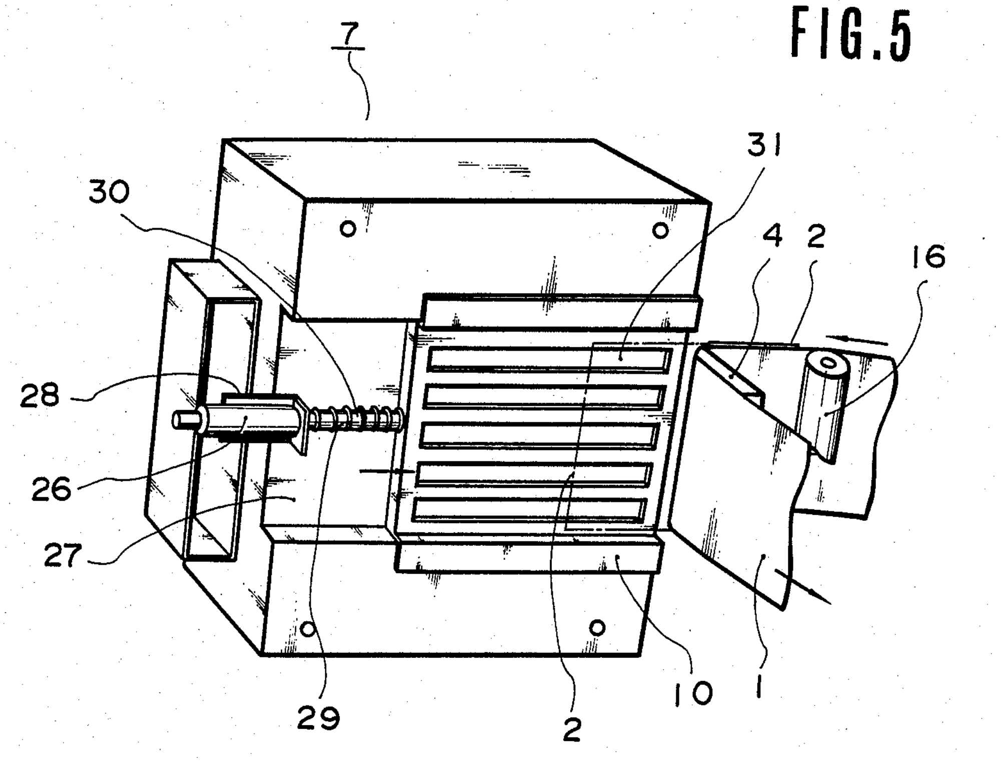
FIG. 5 is a perspective view for illustrating the operation of the intake bracket.
Figure 6:
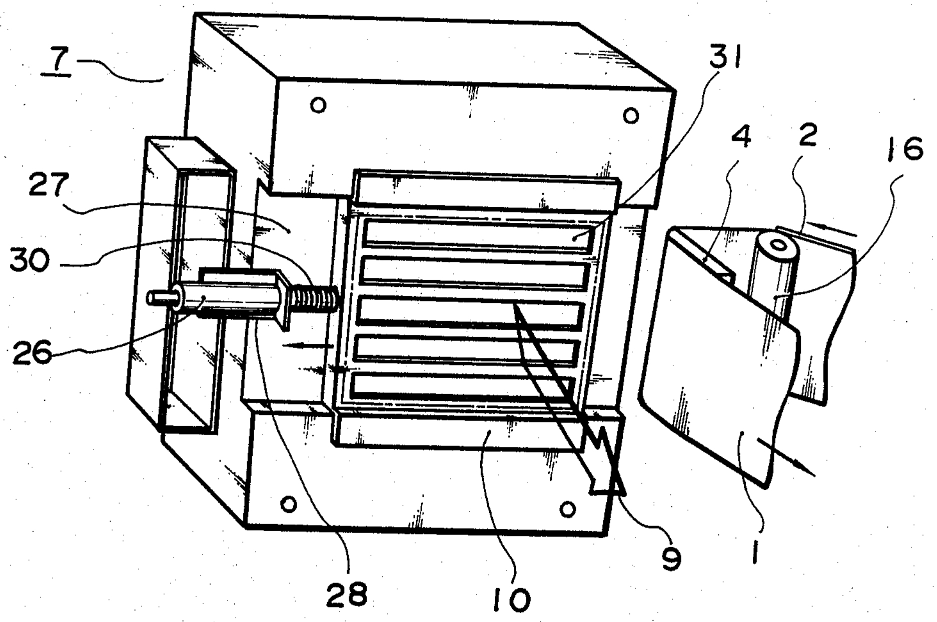
FIG. 6 is a perspective view for illustrating the operation of the exhaust bracket.

An embodiment of the device will be described below with reference to FIG. 4 and the accompanying drawings. In these drawings, the same portions as those of FIGS. 1 to 3 are denoted by the same reference numerals.

Reference numeral 12 denotes a device for suction-sticking display labels according to an embodiment, wherein a reel device 14, a printer 6 and a sticking device 7 are provided on a frame 13 being arranged from a rear portion toward a front portion thereof.

The reel device 14 is provided with the feeding reel 3 and a winding reel 5.

On the feeding reel 3 is wound a long tape 15 which consists of the ground sheet 1 on which are contiguously attached labels 2 of a predetermined size with an adhesive agent. The tape is fed by the rotation of a drive roller 32, and the ground sheet 1 only is wound on the winding reel 5.

Between these two reels, there are interposed guide pulleys 16, 16, . . . , a tension pulley 17, and the drive roller 32.

The peeling metal fitting 4 of which the upper end is tilted forward is installed under the printer 6 and just in front of the lower end of the sticking device 7, in order to peel the label 2 of the tape 15 from the ground sheet 1 by utilizing the difference of rigidity, and to feed the label forward.

The printer 6 is constructed in a customary manner.

Figure 7:
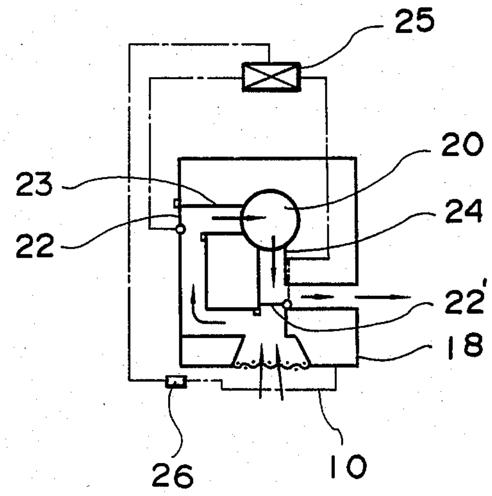
FIG. 7 is a diagram of a mechanism for switching the air-suction damper.
Figure 8:
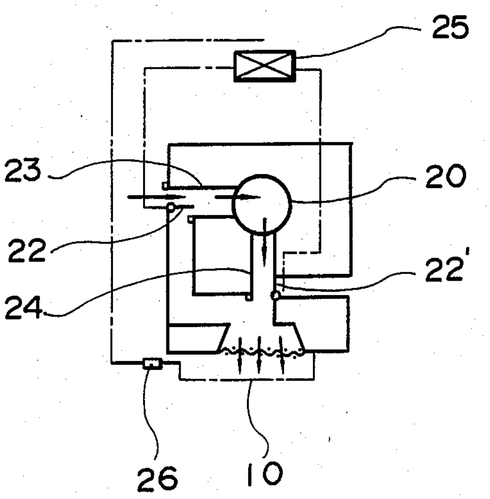
FIG. 8 is a diagram of a mechanism for switching the air-blow damper.

A motor 19 and a blower 20 are provided on one side of a casing 18 of the sticking device 7. Switching dampers 22, 22' coupled to a link mechanism provided in an electromagnetic solenoid 21 on the other side of the casing 18, work to simultaneously switch the air ducts of suction port 23 and exhaust port 24 of the blower 20 in the casing 18 as shown in FIGS. 7 and 8 (which schematically illustrate the mechanism) responsive to outputs of a suitable optical detector via a control device 25.

Thus, the attractive force by the suction of air and the pressure by the blow of air are applied to the intake/exhaust bracket 10 which is located at the lower end of the casing 18 and which slides relative to the casing 18 in front portion of the peeling metal fitting 4.

An electromagnetic solenoid 26 which is electrically connected to the control device 25 is mounted on the lower side of the casing 18, and is mounted on a guide groove 27 of the casing 18 via a mounting metal fitting 28.

The intake/exhaust bracket 10 which is slidable along the guide groove 27 is coupled to the tip of a rod 29 of the electromagnetic solenoid 26, and a compression spring 30 is fitted to the outer side of the rod 29 between the intake/exhuast bracket 10 and the electromagnetic solenoid 26.

Reference numeral 31 denotes a plurality of slits which are formed in the intake/exhaust bracket 10 in the direction in which the intake/exhuast bracket 10 moves.

Width and number of the slits 31 are so selected that the label 2 can be adsorbed and descended easily.

With the thus constructed device, the ground sheet 1 is fed from the feeding reel 3 on which is wound the long tape 15 which consists of labels 2, 2, . . . , that are contiguously attached to the ground sheet.

The ground sheet 1 is then passed through the guide pulleys 16, 16, . . . , the tension pulley 17, the drive roller 32, and the peeling metal fitting 4, and is wound on the winding reel 5. The device 12 for suction-sticking display labels is activated via the control device 25 in synchronism with the feeding of package tray 8.

The tape 15 is fed by the turn of the drive roller 32 and winding reel 5, and the ground sheet 1 is turned at an acute angle at the peeling metal fitting 4.

The label 2 on which the weight, unit price, price, etc. have been printed by the printer 6, is then peeled from the ground sheet 1 due to difference in rigidity between the label 2 and the ground sheet 1.

The label 2 is fed forward to the lower surface of the intake/exhaust bracket 10 of the sticking device.

In this case, the dampers 22, 22' in the sticking device 7 has been switched to the state as shown in FIG. 7. Therefore, the air is sucked through the intake/exhaust bracket 10, and the label 2 is maintained under adsorbed condition owing to the negative pressure.

As mentioned earlier, the ground sheet 1 is fed intermittently. When the ground sheet 1 remains stationary, therefore, the rear end of the label 2 is still slightly attached to the ground sheet 1.

By the control operation of the control device 25, therefore, the electromagnetic solenoid 26 is contracted at a predetermined timing to forwardly move the intake/exhaust bracket 10 by a predetermined distance against the force of the compression spring 30.

Therefore, the label 2 which is adsorbed by the intake/exhaust bracket 10 is completely peeled from the ground sheet 1.

As the package tray 8 reaches just under the label, the dampers 22, 22' are switched instantaneously as shown in FIG. 8 responsive to the output of the optical detector or the like via the control device 25.

Paths for intaking and exhausting the air of the blower 20 are then switched, and the exhuast air blows through the intake/exhaust bracket 10 to descend the label 2.

The label 2 which had been adsorbed then receives the pressure of blowing air, descends in a vertical direction, and is stuck maintaining a proper attitude onto a predetermined position of the package tray 8 which is remaining at the lower position.

Therefore, the label 2 which is descended is never adhered again onto the ground sheet 1.

After the dampers 22, 22' are switched as shown in FIG. 8, the electromagnetic solenoid 26 is de-energized at a predetermined timing determined by the timer.

Therefore, the compression spring 30 urges the intake/exhaust bracket 10 to return to the initial position, and the dampers 22, 22′ are switched by the control device 25 to assume the state shown in FIG. 7, whereby the negative pressure is produced in the intake/exhaust bracket 10 to wait for the next label 2.

The next label 2 is then fed forward via the control device 25, and the aforementioned operation is repeated, to successively stick the labels 2, 2, . . . onto the package trays 8, 8, . . . .

Figure 9:
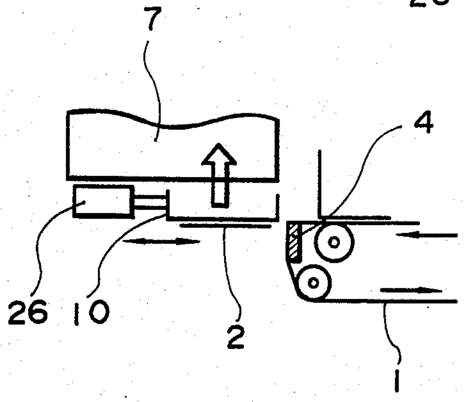
FIG. 9 is a side view of air-blow operation.

FIG. 9 shows the above-mentioned function in comparison with the conventional operation of FIG. 2.

Figure 10:
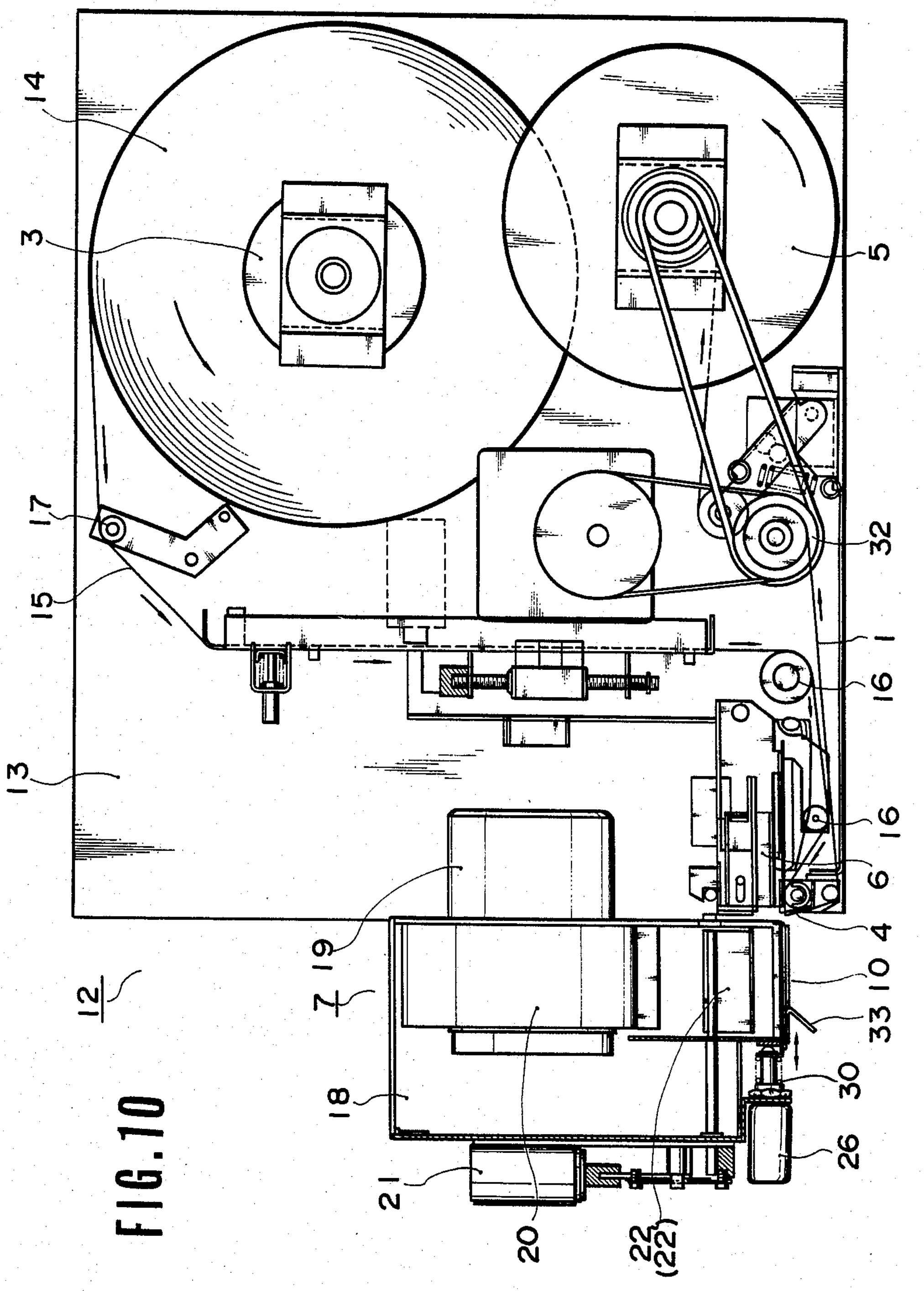
FIG. 10 is a side view which schematically shows the general construction of another embodiment.
Figure 11:
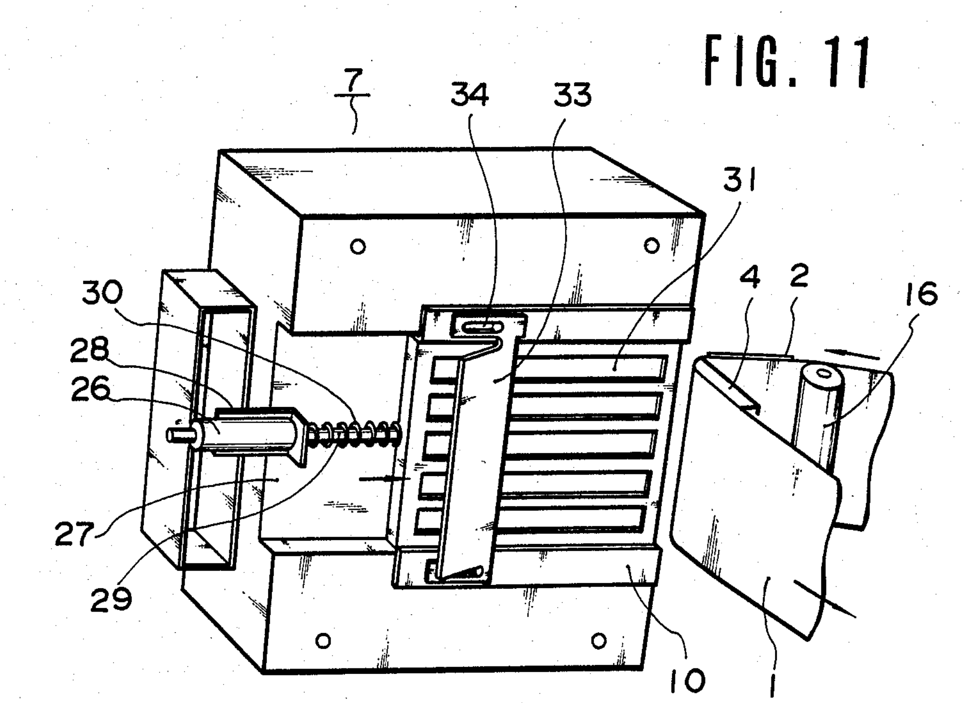
FIG. 11 is a perspective view illustrating the operation of the intake bracket of embodiment of FIG. 10.

As shown in FIG. 10 and subsequent drawings of another embodiment, the rectifying board 30 is mounted via elongated holes 34 on the intake/exhaust bracket 10 maintaining a frontwardly tilted angle relative to the horizontal surface at right angles with the group of slit-like air-flow apertures 31 that run in the back and forth directions.

Here, mounting position of the rectifying board 33 is allowed to be adjusted in the back and forth directions.

Therefore, the rectifying board 33 can be so adjusted as to establish a fully opened state of the group of air-flow apertures 31 to deal with labels 2 of large sizes through up to partly opened state of the group of air-flow apertures 31 to deal with labels 2 of small sizes.

Thus the tape 15 is fed by the turn of the drive roller 32, and the ground sheet 1 is turned at an acute angle at the peeling metal fitting 4.

The label 2 on which the weight, unit price, price, etc. have been printed by the printer 6, is then peeled from the ground sheet 1 due to difference in rigidity between the label 2 and the ground sheet 1.

The label 2 is fed forward to the lower surface of the intake/exhaust bracket 10 of the sticking device.

The intake/exhaust bracket 10 is then pulled by the electromagnetic solenoid 26 responsive to outputs of the control device 25, whereby the label 2 is completely peeled from the ground sheet 1.

In this case, the dampers 22, 22′ in the sticking device 7 has been switched to the state as shown in FIG. 7.

Therefore, the air is sucked through the intake/exhaust bracket 10, and the label 2 is maintained under adsorbed condition owing to the negative pressure.

The rectifying board 33 should be adjusted for its position via elongated holes 34 relative to the intake/exhaust bracket 10, depending upon the size of labels 2 adhered to the tape 15 that is wound on the feeding reel 3.

Namely, the portions of the group of air-flow apertures 11 on the front side of the rectifying board 33 are sufficiently closed, and the label 2 which is sent to the intake/exhaust bracket 10 is reliably adsorbed.

As the package tray 8 reaches just under the label, the dampers 22, 22′ are switched instantaneously as shown in FIG. 8 responsive to the output of the optical detector or the like via the control device 25.

The label 2 which had been adsorbed by the intake/exhaust bracket 10 is then allowed to descend vertically so as to be stuck onto the package tray 8.

Figure 12:
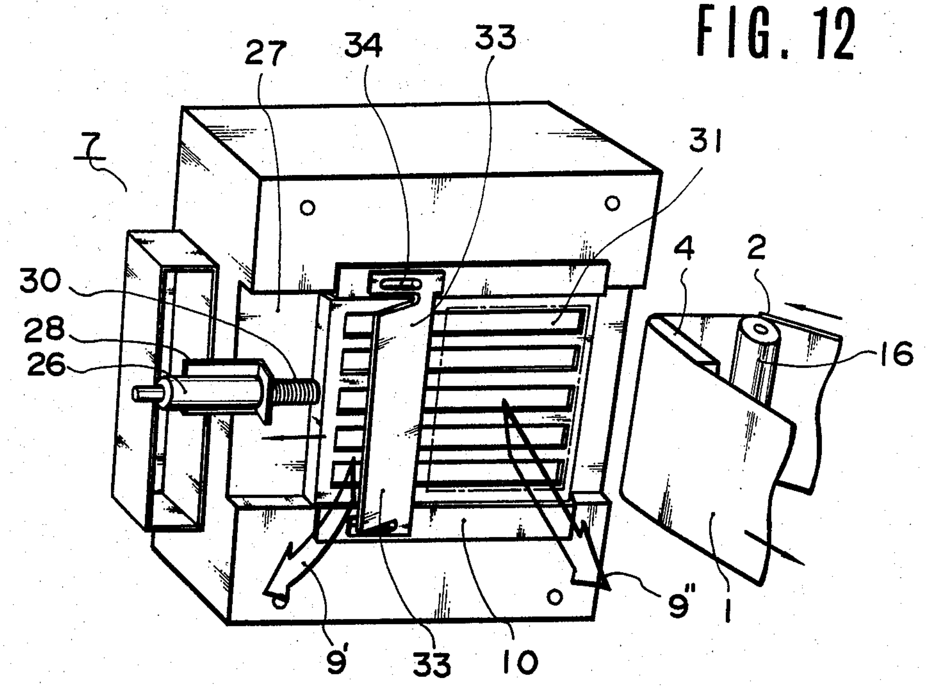
FIG. 12 is a perspective view illustrating the operation of the exhaust bracket of embodiment of FIG. 10.

In this case, as shown in FIGS. 12 and 13, the exhaust air 9′ which is part of the exhaust air 9 blowing through the exhaust duct of the sticking device 7, and which flows through the gap portion of the group of air-flow apertures 31, is deflected frontwardly by the rectifying board 33 which is installed being tilted frontwardly.

Therefore, the exhaust air 9′ does not affect the air 9″ which pushes the label 2 downwards.

Namely, the label 2 is allowed to descend vertically and is stuck reliably maintaining a predetermined attitude onto a predetermined position of the package tray 8.

As the dampers 22, 22′ are switched to the state shown in FIG. 8, the electromagnetic solenoid 26 returns via the control device 25, and the intake/exhaust bracket 10 returns to the initial position as shown in FIG. 8.

After a predetermined period of time has passed, the dampers 22, 22′ are switched again to the state shown in FIG. 8, and the air is sucked through the intake/exhaust bracket 10 to wait for the next label 2 as shown in FIG. 7.

The next label 2 is then fed forward via the control device 25, and the aforementioned operation is repeated, to successively stick the labels 2, 2, . . . onto the package trays 8, 8, . . . .

When the labels 2 of a different size are to be stuck, the position of the rectifying board 33 should be adjusted relative to the intake/exhaust bracket 10 via elongated holes 34.

Further Embodiments:

This device should in no way be limited to the above-mentioned embodiment only. For instance, the rectifying board may be so constructed that its angle of inclination can be adjusted. Or a plurality of rectifying boards may be provided for the intake/exhaust bracket in the back and forth directions and the stroke of the electromagnetic solenoid can be adjusted by employing a stepped stopper, or the device may be modified in various ways.

According to this device which is designed to stick labels adhered to the ground sheet onto articles such as package trays, the label is reliably peeled from the ground sheet in a step in which the label peeled by the peeling metal fitting from the ground sheet is adsorbed by the intake/exhaust bracket.

Accordingly, the label is allowed to descend reliably and is stuck onto the article maintaining a predetermined attitude, but is never adhered again to the ground sheet.

Therefore, failure to stick the label (no label is stuck) can be eliminated. Further, there occurs no variance in the positions for sticking the labels. The labels are reliably stuck without permitting the ends to float.

Furthermore, appearance of the package trays is not deteriorated, and the commercial value is not decreased.

According to this device, the proceed/retract device such as electromagnetic solenoid provided in the sticking device causes the sticking device to undergo displacement by a predetermined distance relative to the duct of the sticking device.

Therefore, in the step in which the label is to be peeled by the peeling metal fitting from the ground sheet, the label is reliably peeled off under the adsorbed condition even in case its rear end is still adhered to the ground sheet.

Moreover, the intake/exhaust bracket is simply slid in the lateral directions at high speeds. Therefore, the adsorbing effect is not at all affected, and descending of the label by the blow of air is not affected, either.

What is claimed is:

1. Apparatus for the successive application of labels to packages conveyed to a label sticking device, including a supply reel for supplying a strip carrying spaced labels; a take-up reel for said strip; means for intermittently moving the strip toward the take-up reel; means, located adjacent the label sticking device, for removing each label from the strip; and an air blower and conduit means interconnecting said label sticking device with the air blower means, an improvement comprising:

a planar bracket slidably supported, at said label sticking device, for movement toward and away from said label removing means, said bracket including slotted apertures extending in the direction of said movement;

a first damper, housed within said label sticking device, movable between a first position in which air from said blower is directed via said conduit means to said bracket apertures, and a second position in which air from said blower is directed via said conduit means to the ambient;

a second damper, housed within said label sticking device, movable between a first position in which air is directed via said conduit means from the ambient through said bracket apertures to said blower, and a second position in which air is directed via said conduit means from said ambient to said blower;

means for simultaneously switching said first and second dampers to respective first and second positions while moving said bracket toward or away from said label removing means; and means, detecting the presence of a package at said label sticking device, for controlling the switching means, wherein before a package is moved to said label sticking device, said switching means simultaneously moves said bracket toward said label removing means while moving said first damper to said second position and said second damper to said first position, so that when said strip is moved toward said take-up reel and a label is removed from said strip, the label is held against the bracket until a package is moved into an appropriate position adjacent the label sticking device, and when said controlling means detects the presence of a package at said label sticking device, said switching means moves said bracket away from said label removing means while simultaneously moving said first damper to said first position and said second damper to said second position, so that said label is conveyed toward said package for adherence thereto.

2. The improvement of claim 1, wherein said controlling means comprises an optical detector.

3. The improvement of claim 1, wherein said switching means comprises a solenoid, said solenoid including means for coupling the movements of said bracket with the movement of said first and second dampers.

4. The improvement of claim 1, and further including deflector means, adjustably mounted on said bracket, for deflecting a portion of the air flowing into or out of said bracket apertures away from the label held against or blown away from, respectively, the bracket apertures.

5. The improvement of claim 4, wherein said deflector means is slidably adjustable on said bracket and is selectively secured in a position wherein the portion of the apertures which become operative to hold, or blow, the label may be selected to correspond to the size of label to be adhered to the package.

* * * * *